United States Patent
Niiya

(10) Patent No.: US 7,701,545 B2
(45) Date of Patent: Apr. 20, 2010

(54) SUBSTRATE FOR LIQUID CRYSTAL DISPLAY DEVICES

(75) Inventor: Hirotaka Niiya, Tsu (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 340 days.

(21) Appl. No.: 11/664,960

(22) PCT Filed: Sep. 5, 2005

(86) PCT No.: PCT/JP2005/016243
§ 371 (c)(1),
(2), (4) Date: Apr. 9, 2007

(87) PCT Pub. No.: WO2006/048973
PCT Pub. Date: May 11, 2006

(65) Prior Publication Data
US 2009/0009709 A1    Jan. 8, 2009

(30) Foreign Application Priority Data
Nov. 2, 2004  (JP)  .............................. 2004-319687

(51) Int. Cl.
*G02F 1/1339* (2006.01)
(52) U.S. Cl. .................. 349/155; 349/129; 349/187
(58) Field of Classification Search .................. 349/106, 349/110, 123, 128, 129, 155, 156, 157, 187
See application file for complete search history.

(56) References Cited

U.S. PATENT DOCUMENTS

2003/0043326 A1* 3/2003 Sawasaki et al. ............ 349/123
2006/0001824 A1* 1/2006 Yamaguchi et al. .......... 349/155
2007/0019148 A1 1/2007 Ueda

FOREIGN PATENT DOCUMENTS

| JP | 57-58124 A | 4/1982 |
|---|---|---|
| JP | 5-303102 A | 11/1993 |
| JP | 5-333346 A | 12/1993 |
| JP | 7-175049 A | 7/1995 |
| JP | 9-105946 A | 4/1997 |
| JP | 2002-372717 A | 12/2002 |
| JP | 2005-4094 A | 1/2005 |
| WO | WO-97/36205 A1 | 10/1997 |
| WO | WO 2004/046804 * | 6/2004 |

* cited by examiner

*Primary Examiner*—Dung Nguyen
*Assistant Examiner*—Tai Duong
(74) *Attorney, Agent, or Firm*—Birch, Stewart, Kolasch & Birch, LLP

(57) ABSTRACT

The present invention provides a substrate for liquid crystal display devices in which a spacer for holding a thickness of a liquid crystal cell can be selectively located in a non-displaying area by techniques of using an ink-jet system and the like, particularly on a substrate for liquid crystal display devices provided with a projection for alignment regulation of a liquid crystal on its surface, a liquid crystal display panel using the substrate for liquid crystal display devices, a liquid crystal display device, and a method of producing the liquid crystal display panel. The substrate for liquid crystal display devices of the present invention is a substrate for liquid crystal display devices having a light-blocking area and a pixel area, including: a projection structure provided within a light-blocking area in a liquid crystal display device along a part of or all of patterns of the light-blocking area in the liquid crystal display device.

13 Claims, 14 Drawing Sheets

SUBSTRATE FOR LIQUID CRYSTAL DISPLAY DEVICES

TECHNICAL FIELD

The present invention relates to a substrate for liquid crystal display devices. More particularly, the present invention relates to a substrate for liquid crystal display devices which is suitably mounted on a Vertical Alignment (VA) mode liquid crystal display panel, a liquid crystal display panel using the substrate for liquid crystal display devices, a liquid crystal display device, and a method of producing the liquid crystal display panel.

BACKGROUND ART

A liquid crystal display device is used in various areas exploiting the advantages of being slim and lightweight, and low power consumption. A liquid crystal display panel (liquid crystal display element), used as a primary member in such a liquid crystal display device, generally has a constitution in which a liquid crystal material is sandwiched between a pair of glass substrates and a distance (cell gap) between two glass substrates is kept by a spacer.

Presently, as a spacer for liquid crystal display panels, spherical spacers mainly composed of plastic or an inorganic material are employed. And, as a method of locating such a spherical spacer on a substrate, a wet-spraying method of spraying a spacer dispersion liquid in the form of a liquid mist or a dry-spraying method of using an inert gas such as nitrogen or the like is generally employed. However, in these spraying methods, since the spacer is located on the substrate irregularly (in a random fashion), the spacer might be located in a displaying area and displaying characteristics might be adversely affect.

And so, various technologies of locating a spacer only in a non-displaying area are being investigated. As one of such technologies, for example, a technology of forming a resin spacer (the so-called photo spacer) by a photolithography process using a photosensitive resin material is proposed. According to this technology, a resin spacer can be selectively located at a desired position (in a non-displaying area) by prescribed exposure using a mask. However, the resin spacer formed by the photolithography process is inferior to a plastic spacer in point of cell thickness control so as to be uniform since it has larger variations in thickness than a plastic spacer. And, the resin spacer causes a production cost to increase significantly compared with the plastic spacer since this spacer uses a photolithography process.

On the other hand, various technologies of selectively locating a spherical spacer only in a non-displaying area are being investigated. For example, a method of removing the spacer located in a displaying area after spraying spacers throughout the surface of a substrate is proposed in Japanese Kokai Publication Hei-05-333346 and a method of printing a spacer in a non-displaying area using a printing method is proposed in Japanese Kokai Publication Hei-05-303102. However, there was a room for contrivance to improve in that in the former method, an additional step of removing the spacer in a displaying area is required. In the latter method, there is a possibility of adversely affecting the alignment of a liquid crystal because a screen for printing makes contact with an aligned displaying area.

Then, as a noncontact method of spraying the spherical spacers only in a non-displaying area, techniques of printing a spacer using an ink-jet (IJ) system are proposed in Japanese Kokai Publication Sho-57-58124, WO 97/36205, and Japanese Kokai Publication 2002-372717. However, it was very difficult to print a spacer evenly only in the non-displaying area in view of the ejection accuracy of an IJ system and widths of a black matrix (BM) and wires, which are non-displaying areas, and this is not described in the patent documents described above. On this problem, a method, in which the degradation of display characteristics resulting from running over of the spacer into a displaying area is inhibited by applying coloring treatment or alignment treatment to the surface of a spacer in advance taking running over of the spacer into a displaying area into account, is also contrived.

And, in recent years, display modes such as a Vertical Alignment (VA) mode and an In-Plane Switching (IPS) mode, which are a kind of liquid crystal display mode with a wide viewing angle, are widely employed other than a Twisted Nematic (TN) mode, generally used, as a liquid crystal display mode. In the VA mode, some rib-shaped projection structures for alignment regulation are provided not only within a pixel area but also in a non-displaying area. If there is such a rib-shaped projection structure and the like, a spacer dispersion droplet ejected by the IJ system and the like has a tendency to be evaporated along the rib-shaped projection structure, and therefore there is a possibility that the spacer is also located in the pixel area. Further, also in a TN mode and an IPS mode, it was difficult to locate all spacers in the non-displaying area due to the relationship between the ejection accuracy of an IJ system and the width of a non-displaying area as described above.

Thus, the difficulty of locating the spacer in the non-displaying area is going on increasing and the solution for this problem has been required.

[Patent Document 1]

Japanese Kokai Publication No. Hei-05-333346

[Patent Document 2]

Japanese Kokai Publication No. Hei-05-303102

[Patent Document 3]

Japanese Kokai Publication No. Sho-57-58124

[Patent Document 4]

WO 97/36205

[Patent Document 5]

Japanese Kokai Publication No. 2002-372717

DISCLOSURE OF THE INVENTION

Problems to be Solved by the Invention

In view of the above state of the art, it is an object of the present invention to provide a substrate for liquid crystal display devices in which a spacer for holding a thickness of a liquid crystal cell can be selectively located in a non-displaying area by techniques of using an ink-jet system and the like, particularly on a substrate for liquid crystal display devices provided with a projection for alignment regulation of a liquid crystal on its surface, a liquid crystal display panel using the substrate for liquid crystal display devices, a liquid crystal display device, and a method of producing the liquid crystal display panel.

The present inventor made various investigations concerning a method of locating a spacer selectively only in a light-blocking area in a liquid crystal display device by a technique of using a spacer dispersion, such as an ink-jet (IJ) method and the like, for a substrate for VA mode liquid crystal display devices provided with a projection for alignment regulation of a liquid crystal in a pixel area in a liquid crystal display device, and consequently have noted the behavior of a spacer in an evaporating process of a spacer dispersion droplet hitting and adhering to the substrate. And, the present inventor found that when the spacer dispersion droplet makes contact with the projection for alignment regulation, a possibility that the spacer is located in the pixel area in the liquid crystal display device along the projection for alignment regulation increases since a center of the droplet moves to the side of the projection for alignment regulation and the droplet is gradually evaporated mainly around the projection for alignment regulation. And so, the present inventor found that by providing the projection structure for spacer location control within the light-blocking area in the liquid crystal display device along patterns of the light-blocking area in the liquid crystal display device, a spacer can be selectively located in the light-blocking area in the liquid crystal display device by a technique of using an ink-jet (IJ) system and the like. And, the present inventor found that such the projection structure for spacer location control is effective for controlling the selective location of a spacer in the light-blocking area in the liquid crystal display device even when the projection structure is applied to a substrate for liquid crystal display devices used for a display mode, such as a Twisted Nematic (TN) mode and an In-Plane Switching (IPS) mode, where the projection for alignment regulation is not provided and thereby the above-mentioned problems can be solved. These findings have now led to completion of the present invention.

That is, the invention relates to a substrate for liquid crystal display devices having a light-blocking area and a pixel area, including:

a projection structure provided within a light-blocking area in a liquid crystal display device along a part of or all of patterns of the light-blocking area in the liquid crystal display device. The light-blocking area in the liquid crystal display device is a non-displaying area formed by light-blocking members such as a black matrix (BM) and wires, and generally, the light-blocking area consists of patterns in the form of a network running in a substrate plane so as isolate a plurality of pixel areas (display areas). In addition, the light-blocking member forming the light-blocking area in the liquid crystal display device may be provided in the substrate of the present invention in which the projection structure for spacer location control is provided. The light-blocking member may be provided in an opposite substrate which is opposed to the substrate of the present invention and constitutes a liquid crystal display panel. The light-blocking member may be provided in both substrates.

In the present invention, a projection structure (also referred to as a projection for spacer location control) provided within the light-blocking area in the liquid crystal display device along a part of or all of patterns of the light-blocking area in the liquid crystal display device is provided for the purpose of locating a spacer selectively in the light-blocking area in the liquid crystal display device, and the projection structure may also have a function of regulating the alignment of a liquid crystal in the case of a substrate for VA mode liquid crystal display devices. In the present invention, by providing the projection for spacer location control, it is possible to selectively locate a spacer in the light-blocking area in the liquid crystal display device with higher accuracy than the ejection accuracy of an IJ system even when the position, which a spacer dispersion droplet ejected from the IJ system hits and adheres to, deviates somewhat. The present invention can be applied to a Twisted Nematic (TN) mode and an In-Plane Switching (IPS) mode in addition to a Vertically Alignment (VA) mode.

A constitution of the substrate for liquid crystal display devices of the present invention may be one having features described above as an essential constituent and having constituents which the substrate for displays usually has, and it is not particularly limited in another constitutions.

The projection for spacer location control may be a continuous body or a discontinuous body having slit which is along patterns of the light-blocking area in the liquid crystal display device as long as it is provided along patterns of the light-blocking area in the liquid crystal display device in its entirety. Both bodies can improve the accuracy of spacer location. The slit more preferably has a smaller width, and among others, the slit more preferably has a width smaller than a diameter of a spacer dispersion droplet after hitting and adhering to the substrate.

In-addition, the projection for spacer location control is preferably provided along a part of or all of patterns of the light-blocking area in a substrate (the substrate for liquid crystal display devices) in which the projection is to be formed or a part of or all of patterns of the light-blocking area in an opposite substrate.

And, the projections for spacer location control are preferably provided substantially evenly spaced apart in a substrate plane and more preferably provided substantially uniformly throughout the substrate plane. Thereby, it becomes possible to fabricate a cell gap irregularity-free liquid crystal display panel.

A material of the projection for spacer location control is preferably lyophilic (inkphilic). Thereby, the operation and effect of the present invention is more adequately attained.

A width of the projection for spacer location control is preferably smaller than a particle diameter of the spacer. Thereby, it is possible to prevent the spacer from being located above the projection for spacer location control. The cross-sectional profile of the projection for spacer location control is not particularly limited and it includes a spike form, a trapezoid, and a rectangle.

It is preferable that the substrate for liquid crystal display devices constitutes the liquid crystal display device together with an opposite substrate and the projection structure is provided at a position within a light-blocking area in a projection structure-formed substrate or at a position corresponding to an area within a light-blocking area in the opposite substrate. Thereby, since the projection for spacer location control is provided at the position within an area where light is blocked by a light-blocking member of the substrate for liquid crystal display devices or at the position corresponding to an area within an area where light is blocked by a light-blocking member of an opposite substrate, a spacer can be selectively located in the light-blocking area in the liquid crystal display device by a technique of using an ink-jet (IJ) system and the like.

In addition, when the projection for spacer location control is provided at the position within a light-blocking area in a substrate in which the projection is to be formed, this position may be a position corresponding to an area within the light-blocking area in the opposite substrate or may be a position corresponding to an area outside the light-blocking area in the opposite substrate. And, when the projection for spacer location control is provided at the position outside a light-blocking area in a substrate in which the projection is to be formed in a light-blocking area in a light-blocking area in the liquid crystal display device, this position is preferably located at a position corresponding to an area within the light-blocking area in the opposite substrate.

The substrate for liquid crystal display devices preferably further includes a projection for alignment regulation provided in a pixel area in the liquid crystal display device; and the projection structure provided in a vicinity of an intersection of an outer edge of the light-blocking area in the liquid crystal display device and the projection for alignment regulation. In the present invention, when the projection for alignment regulation is provided so as intersect an outer edge of the light-blocking area in the liquid crystal display device, it is possible to prevent the spacer dispersion droplet from proceeding with evaporation mainly around the projection for alignment regulation in the pixel area in the liquid crystal display device to selectively locate the spacer in the light-blocking area in the liquid crystal display device by providing the projection for spacer location control along patterns of the light-blocking area in the liquid crystal display device in the vicinity of intersection of the light-blocking area in the liquid crystal display device and the projection for alignment regulation. In addition, the projection for spacer location control and the projection for alignment regulation may be provided in a unified manner or may be provided separately. A pattern of locating the projection for alignment regulation is not particularly limited and examples of the pattern include a pattern in continuous form provided throughout the substrate or a zigzag pattern in discontinuous form.

Further, it is more preferred that the substrate for liquid crystal display devices further includes a projection for alignment regulation at least in the pixel area in the substrate for liquid crystal display devices and the projection for spacer location control is provided in the vicinity of intersection of an outer edge of the light-blocking area in the substrate for liquid crystal display devices and the projection for alignment regulation. And, it is more preferred that the substrate for liquid crystal display devices further includes a projection for alignment regulation at least within the pixel area in the opposite substrate and the projection for spacer location control is provided in the vicinity of intersection of an outer edge of the light-blocking area in the opposite substrate and the projection for alignment regulation.

It is preferable that the projection structure is composed of substantially the same material as the projection for alignment regulation. Thereby, the projection for spacer location control and the projection for alignment regulation can be formed by the same process step and therefore a production cost can be reduced. Incidentally, in this case, as a method of forming the projection for spacer location control and the projection for alignment regulation, a photolithography process using a photosensitive resin material is suitably used.

And, the projection structure is preferably provided in two or more rows per pattern of the light-blocking area in the liquid crystal display device. For example when a plurality of the patterns of the light-blocking area in the liquid crystal display device extend in parallel, the projection for spacer location control is preferably provided in two or more rows in every pattern. In accordance with such a configuration, the operation and effect of the present invention is more adequately attained. Here, it is more preferred to ensure that a distance between rows of the projection is larger than a particle diameter of the spacer to be located.

The projection for spacer location control is preferably provided in two or more rows per pattern of the light-blocking area in the liquid crystal display device. Also, the projection for spacer location control is more preferably provided in two or more rows per pattern of the light-blocking area in an opposite substrate.

The substrate for liquid crystal display devices is preferably a color filter substrate. Thereby, it is possible to provide a color filter substrate which can locate a spacer selectively in an area which is light-blocked by the BM and the like. The color filter substrate has, for example, a substrate constitution in which color layers of three colors of red, green and blue, and a BM and a bank, which isolate one color layer from the other color layer, are provided on the substrate in every pixel, and in an upper section thereof, an overcoating, an opposite electrode and an alignment layer are disposed by lamination. In addition, the BM may also serve as the bank.

The substrate for liquid crystal display devices is preferable a thin film transistor array substrate. Thereby, it is possible to provide a thin film transistor array substrate which can locate a spacer selectively in an area, light to which is blocked by a wiring, a thin film transistor, or the BM in the opposite substrate. The thin film transistor array substrate has, for example, a substrate constitution in which a gate wiring and storage capacitor wiring are provided on the substrate, and in an upper section thereof, a gate insulator, a semiconductor layer, source/drain wirings, an overcoating (including a contact hole), a pixel electrode and an alignment layer are disposed by lamination.

The invention also provides a liquid crystal display panel including the substrate for liquid crystal display devices and a spacer provided in a vicinity of the projection structure, and a liquid crystal display device including the liquid crystal display panel. In accordance with such a liquid crystal display panel and a liquid crystal display device, it is possible to provide a liquid crystal display panel and a liquid crystal display device, having high display quality, in which the degradation of display characteristics resulting from a spacer is found little and a cell gap is held stable by the spacer.

The present invention further pertains to a method of producing the liquid crystal display panel, including:

a step of ejecting a spacer dispersion liquid in a vicinity of the projection structure with an ejecting system. In accordance with such a production method of the liquid crystal display panel, the spacer can be located in the light-blocking area in the liquid crystal display device close to a projection for spacer location control in a concentrated manner and the degradation of display characteristics resulting from a spacer can be prevented. As the ejecting system, an ink-jet system is suitable. Thereby, since it is possible to adjust a trace of a droplet, the accuracy of locating a spacer can be further improved.

In accordance with the substrate for liquid crystal display devices of the present invention, a spacer can be selectively located in the light-blocking area in the liquid crystal display device also by a technique of using a spacer dispersion liquid with an ink-jet system since a projection structure aimed at spacer location control is provided within the light-blocking area in the liquid crystal display device along a part of or all of patterns of the light-blocking area in the liquid crystal display device.

BEST MODE FOR CARRYING OUT THE INVENTION

Hereinafter, the present invention will be described in more detail by way of an experimental example and examples. But the present invention is not limited to the following experimental example and examples.

[Operative Example]

A spacer dispersion droplet was ejected onto a color filter (CF) substrate using an ink-jet (IJ) system and the accuracy of locating a spacer was verified.

The droplet ejected by the IJ system was spread roundly on the substrate and its diameter become adequately larger than a width of a black matrix (BM: a light-blocking area), which is a target of ejection. Then, the droplet was gradually evaporated from the periphery and therefore it decreased in diameter and spacers in the droplet gathered toward the central position of the droplet.

When a projection structure such as a projection for alignment regulation does not exist on a layer (surface of a substrate) on which the droplet was ejected, the ejected droplet was evaporated without shifting considerably the central position of the droplet and the spacer was located in the vicinity of the central position of the droplet immediately after hitting and adhering to the layer. For example, when the ejection by an IJ system is performed precisely in ejecting the droplet on the layer on which the projection structure does not exist as shown in FIGS. 1A to 1C, the spacer 17 was located precisely in the light-blocking area. However, there may be cases where a variation in the ejection by an IJ system may occur, and when the position, which the droplet hits and adheres to, deviates in ejecting the droplet on the layer on which the projection structure does not exist as shown in FIGS. 2A to 2C, the spacer 17 was located at a position deviated from a target position and a spacer 17 lying off the BM 11 was observed. When the layer on which the droplet is ejected is flat like this, the accuracy of locating the spacer 17 gave close agreement with the ejection accuracy of the IJ system.

When a projection structure such as a projection for alignment regulation exists on a layer on which the droplet was ejected, since the ejected droplet was evaporated at and around the projection structure as a base point, the central position of the droplet was shifted. For example, when the projection structure 15a exists only within the light-blocking area as shown in FIGS. 3 (a) to 3 (c) and FIGS. 4 (a) to 4 (c), a proportion of the spacer 17 to be located around the projection structure 15a provided in the light-blocking area increased even though the initial position, which the droplet hits and adheres to, deviates. On the contrary, when the projection structure 15b exists only within the pixel area as shown in FIGS. 5 (a) to 5 (c) and FIGS. 6 (a) to 6 (c), a proportion of the spacer 17 to be located around the projection structure 15b in the pixel area increased even though the initial position, which the droplet hits and adheres to, is precise.

And, when a plurality of projection structures exist in the droplet, the ejected droplet was evaporated along the projection structure close to the central position of the droplet immediately after hitting and adhering to the substrate. For example, when the central position of the droplet immediately after hitting and adhering to the substrate is close to the projection structure 15a provided in the light-blocking area as shown in FIGS. 7 (a) to 7 (c) and FIGS. 8 (a) to 8 (c), the spacer 17 was located at a target position since the droplet was evaporated along the projection structure 15a whether the position, which the droplet hits and adheres to, deviates somewhat or not. In this case, from the ejection accuracy of the IJ system, the central position of the droplet immediately after hitting and adhering to the substrate hardly lies close to the projection structure 15b provided in the pixel area and the spacer 17 was hardly located around the projection structure 15b provided in the pixel area.

Embodiment 1

FIG. 9 is a schematic plan view showing a constitution of a color filter (CF) substrate used in Embodiment 1.

The CF substrate used in Embodiment 1 has a structure in which a rib-shaped projection 15b for alignment regulation for a Vertical Alignment (VA) mode is mainly provided in the pixel area and a projection 15a (4 μm in width, 1 μm in height) for spacer location control is provided in the light-blocking area (20 μm in width) above the BM 11 as shown in FIG. 9.

And, the projection 15a for spacer location control is composed of the same material as the rib-shaped projection 15b for alignment regulation and both projections are integrally formed. A material of the projection 15a spacer location control and the rib-shaped projection 15b for alignment regulation is not particularly limited, but photosensitive resins such as a photosensitive acrylic resin and a photosensitive polyimide resin are preferred and among others, a positive photosensitive resin is more preferable. Further, the cross-sectional profile of the projection 15a for spacer location control does not requires such an accuracy as the rib-shaped projection 15b has. For example even when a small number of spacers 17 are located on the projection 15a for spacer location control, such irregularities in the cell thickness as to have an effect on display quality is hardly produced. However, by employing a spike-shaped cross-sectional profile as a cross-sectional profile of the projection 15a for spacer location control, placement of the spacer 17 on the projection 15a for spacer location control may be more adequately prevented. The same operation and effect can also be attained by reducing the width of the projection 15a for spacer location control.

As a combination of color of the color layers 12a, 12b and 12c constituting the pixel area, the primary colors of light of red, green, and blue may be used, and another three colors or three or more colors may be used. And, an array of the color layers 12a, 12b and 12c is not limited to a dot array, and for example, a stripe array, a mosaic array, or a delta array may be employed.

To such a CF substrate, a spacer dispersion liquid was ejected in a light-blocking area along the direction of the length of the pixel with an IJ system as shown in FIG. 9. Further, in this example, a dispersion liquid formed by dispersing plastic beads 17 (particle size: 4.0 μm) in a mixed dispersion medium 18 of ethylene glycol and water was used as a spacer dispersion liquid. Further, a material of the spacer 17 is not limited to a plastic bead and it may be glass or silica. And, coloring or alignment treatment may be applied to the surface of the spacer 17 or an adhesive surface layer may be formed on the surface of the spacer 17. Furthermore, a dispersion medium 18 is not limited to the mixed dispersion medium of ethylene glycol and water, and it may be appropriately selected in accordance with a material of the spacer 17. An ejecting system is not limited to the IJ system and a dispenser system and the like may be employed as an ejecting system.

FIGS. 10A to 10C are schematic sectional views showing a section taken on line A-B of the CF substrate shown in FIG. 9 and shows sequentially the situation of a dispersion droplet and a spacer varying until the spacer is located since the dispersion droplet hits and adheres to the substrate. First, the ejected droplet hit and adhered to the substrate astride a projection 15a for spacer location control and a rib-shaped projection 15b for alignment regulation as shown in FIG. 10A. A droplet diameter at the time when the diameter became largest was approximately 60 μm. Next, the droplet was subjected to the step of drying, and consequently the droplet was gradually evaporated mainly around the projection 15a for spacer location control close to the central position of the droplet immediately after hitting and adhering to the substrate as shown in FIG. 10B. As a result of this, the plastic bead 17 was selectively located in an area (non-displaying area), light to which is blocked by the BM 11 as shown in FIG. 10C.

Accordingly, it was proven that in accordance with the CF substrate used in this embodiment, a spacer could be located with high accuracy by an existing technique of using an ink jet system. And, it was proven that since the projections 15a for spacer location control are provided in two rows throughout the light-blocking area as shown in FIG. 9, almost plastic beads 17 can be located in the light-blocking area as long as the central position of the droplet immediately after hitting and adhering to the substrate is close to the projection 15a for spacer location control even when the deviation of ejection of the IJ system in the width direction of the pixel occurs somewhat. Furthermore, it was proven that since the projections 15a for spacer location control are provided continuously throughout the light-blocking area as shown in FIG. 9, the deviation of ejection of the IJ system in the length direction of the pixel can be adequately met. And, since the projection 15a for spacer location control is composed of the same material as the rib-shaped projection 15b for alignment regulation, the projection 15a for spacer location control could be prepared without an additional process step and a production cost could be reduced.

Embodiments 2 to 5

FIGS. 11 to 14 are schematic plan views showing constitutions of CF substrates used in Embodiments 2 to 5. Each of the CF substrates used in Embodiments 2 to 5 also has a structure in which a projection 15a for spacer location control is provided in the light-blocking area in such a way that a projection structure to become the base point of evaporation of a droplet exists in the droplet having hit and adhered to the substrate as shown in FIGS. 11 to 14. Accordingly, also in the case of using these CF substrates, the spacer could be selectively located in the light-blocking area as with Embodiment 1 since the spacer dispersion droplet having hit and adhered to the substrate was evaporated along the projection 15a for spacer location control.

As is evident from these embodiments, number of the projections 15a for spacer location control provided in the light-blocking area is not particularly limited to improve the accuracy of locating a spacer. And, the projection 15a for spacer location control may be continuous in a whole area or may have a slit. Thus, a pattern of the projection 15a for spacer location control is not particularly limited as long as the pattern is formed in such a way that a projection structure exists in the vicinity of the central position of the droplet having hit and adhered to the substrate.

Embodiment 6

FIG. 15 is a schematic plan view showing a constitution of a CF substrate used in Embodiment 6.

The CF substrate used in Embodiment 6 has a structure in which a rib-shaped projection 15b for alignment regulation for a VA mode is mainly provided in the pixel area and an area provided with a projection 15a for spacer location control and an area not provided with a projection 15a for spacer location control exist together above the BM 11 above which the spacer is sprayed as shown in FIG. 15. Also in the case of using the CF substrate used in this embodiment, the spacer could be selectively located only in the light-blocking area by allowing the spacer dispersion droplet to hit and adhere to only the area provided with the projection 15a for spacer location control.

[Evaluation of Accuracy of Locating a Spacer]

The accuracy of locating a spacer in ejecting a spacer dispersion to each of the CF substrates used in Embodiments 1 to 6 using an ink-jet system was measured. The results of the measurement are shown in Table 1. Further, width of a pattern of the BM 11, which is an ejection target, was 20 µm.

As is evident from Table 1, in the CF substrate in which no projection 15a for spacer location control is provided, about 80% of the spacers were located at a target position. This result represents the ejection accuracy of the IJ system. On the other hand, in each of the CF substrates of Embodiments 1 to 5, the spacers could be located at a target position with the accuracy of approximate 95%. And, in the CF substrate of Embodiment 6, the spacers could be located at a target position with the accuracy of 88% by allowing the spacer dispersion droplet to hit and adhere to only the area provided with the projection 15a for spacer location control. That is, it was proven that it is possible to attain the accuracy higher than the ejection accuracy of the system by contriving a locational pattern of the projection 15a for spacer location control.

Therefore, a liquid crystal display panel (liquid crystal display element) fabricated by locating a spacer for these CF substrates had excellent display characteristics.

TABLE 1

| Pattern | No pattern | Embodiment | | | | | |
|---|---|---|---|---|---|---|---|
| | | 1 | 2 | 3 | 4 | 5 | 6 |
| Accuracy of locating | 83% | 98% | 97% | 96% | 93% | 92% | 88% |

Embodiment 7

FIG. 16 is a schematic plan view showing a constitution of a thin film transistor (TFT) array substrate used in Embodiment 7, and FIG. 17 is a schematic sectional view showing a constitution of a liquid crystal display panel fabricated using the TFT array substrate shown in FIG. 16, wherein the TFT array substrate 100 in FIG. 17 corresponds to a section taken on line C-D of the TFT array substrate shown in FIG. 16.

In a TFT array substrate 100 used in Embodiment 7, as shown in FIGS. 16 and 17, projections 25a (4 µm in width, 1 µm in height) for spacer location control in the form of continuous body are provided outside the area where light is blocked by a source wiring 21b, are provided in two rows in a light-blocking area (20 µm in width) formed by a BM 11 of a CF substrate 200. Also in this embodiment, a spacer 17 could be located in the non-displaying area with high accuracy for the TFT array substrate 100 by an existing technique of ejecting a spacer dispersion using an ink-jet system. Therefore, a liquid crystal display panel (liquid crystal display element) fabricated by using the TFT array substrate 100 had excellent display characteristics.

This Nonprovisional application claims priority under 35 U.S.C. §119(a) on Patent Application No. 2004-319687 filed in Japan on Nov. 2, 2004, the entire contents of which are hereby incorporated by reference.

Figure 1A:
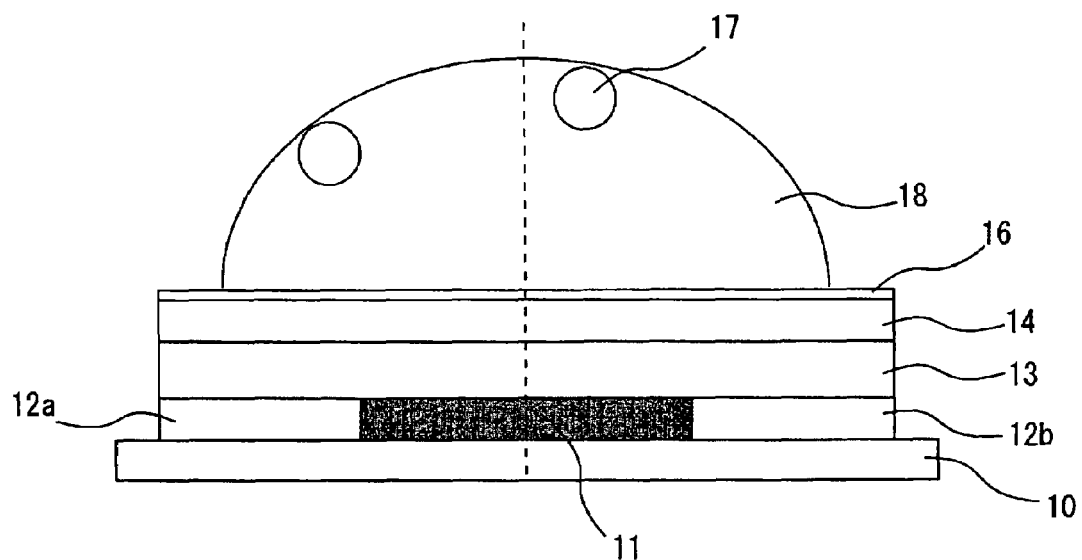
FIGS. 1A to 1C are schematic sectional views showing sequentially the situation of a dispersion droplet and a spacer varying until the spacer is located since the dispersion droplet hits and adheres to a substrate in the case where the ejection by an IJ system is performed precisely in ejecting the spacer dispersion liquid on a color filter (CF) substrate on which a projection structure does not exist, wherein a dotted line in FIGS. 1A to 1C represents the center of the droplet at the time when the droplet hits and adheres to the substrate and a hollow arrow shows changes in a shape of the droplet.
Figure 1B:
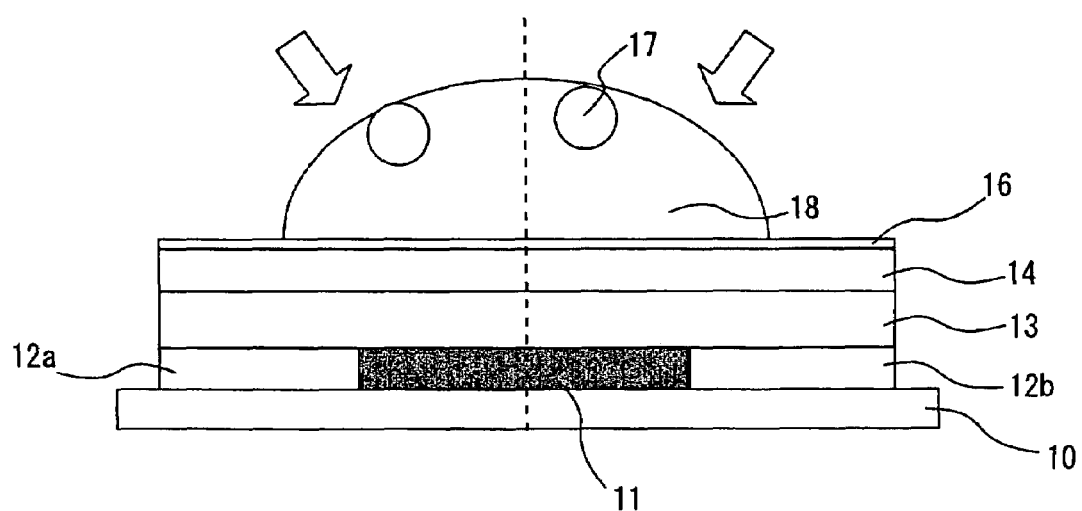
Figure 1C:
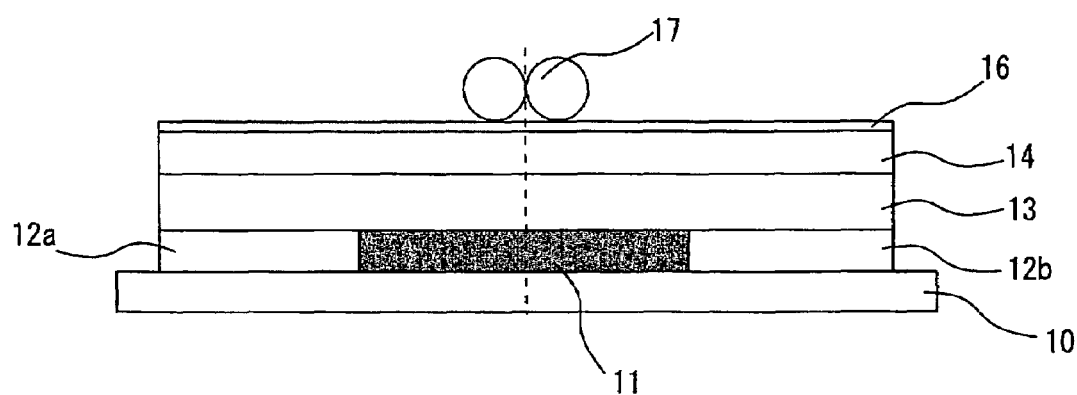
Figure 2A:
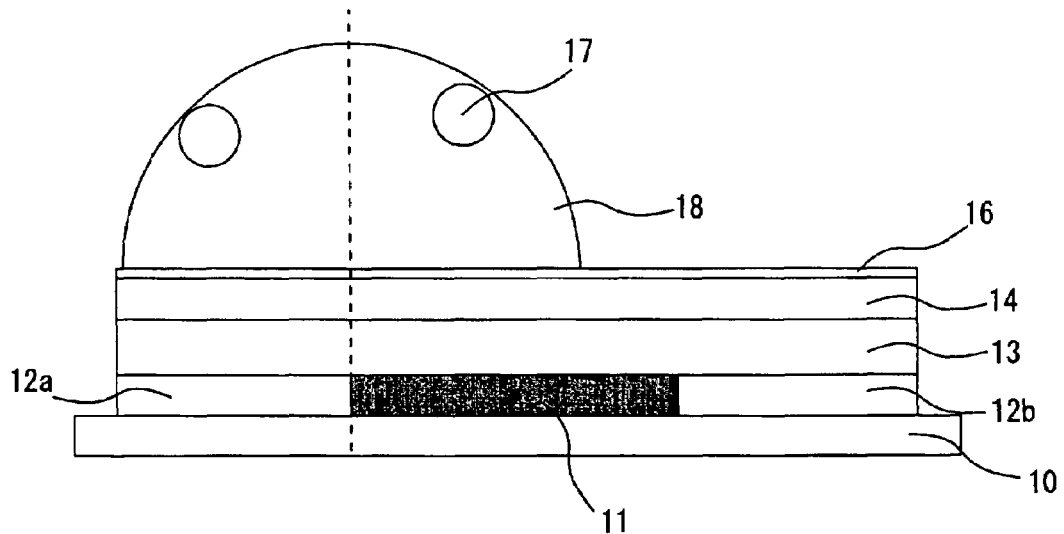
FIGS. 2A to 2C are schematic sectional views showing sequentially the situation of a dispersion droplet and a spacer varying until the spacer is located since the dispersion droplet hits and adheres to the substrate in the case where the droplet is ejected on a position deviated from a target position by an IJ system in ejecting the spacer dispersion liquid on a CF substrate on which a projection structure does not exist, wherein a dotted line in FIGS. 2A to 2C represents the center of the droplet at the time when the droplet hits and adheres to the substrate and a hollow arrow shows changes in a shape of the droplet.
Figure 2B:
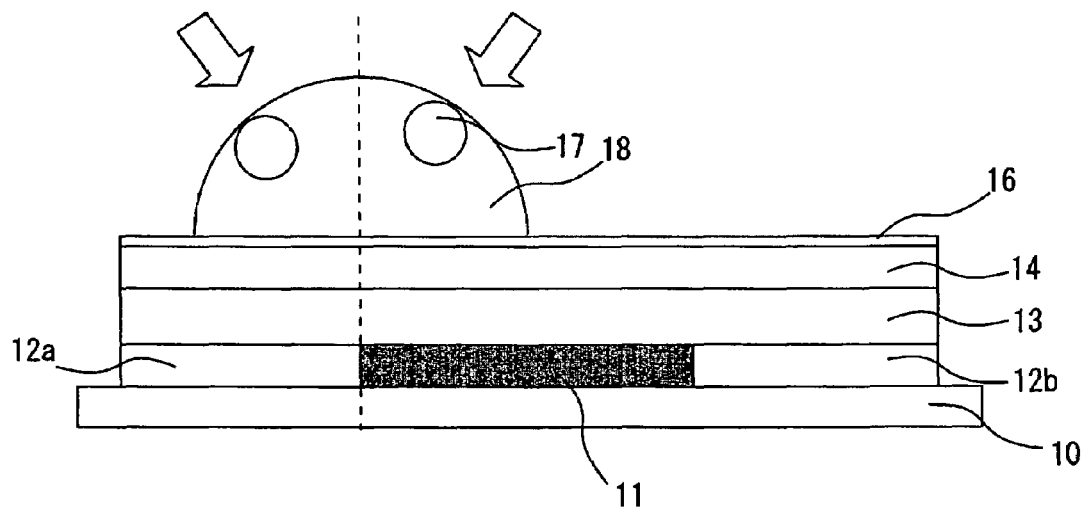
Figure 2C:
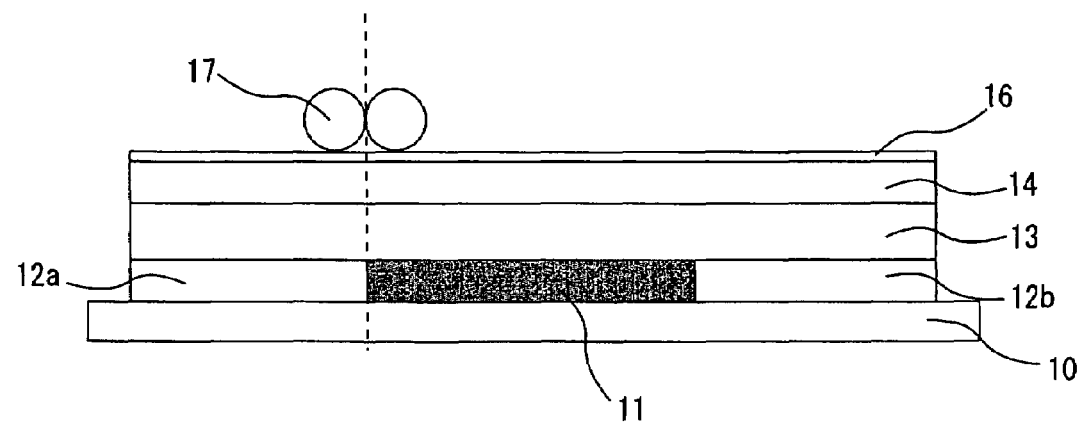
Figure 3A:
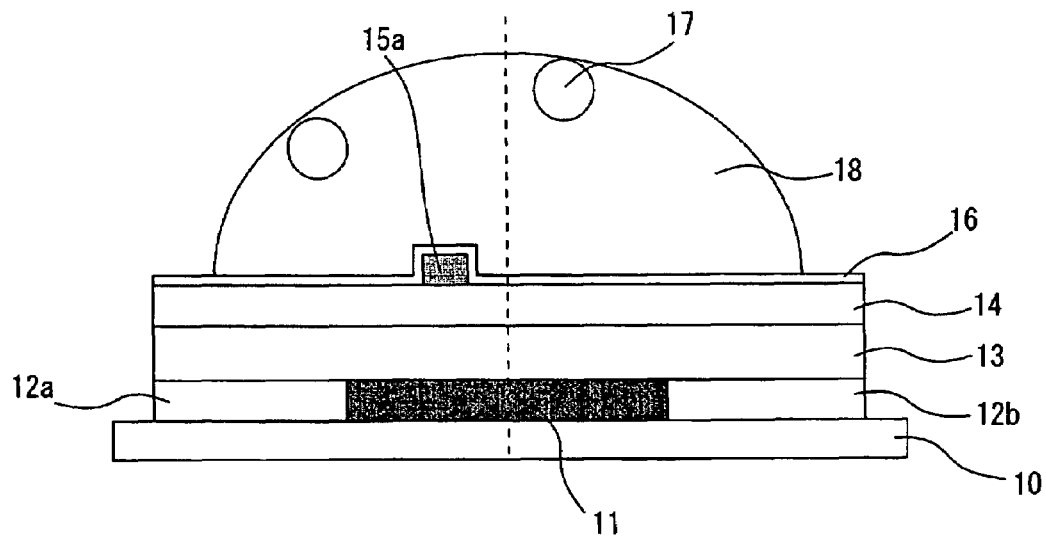
FIGS. 3A to 3C are schematic sectional views showing sequentially the situation of a dispersion droplet and a spacer varying until the spacer is located since the dispersion droplet hits and adheres to the substrate in the case where the spacer dispersion liquid is ejected on a CF substrate on which a projection structure exists only within a light-blocking area, wherein a dotted line in FIGS. 3A to 3C represents the center of the droplet at the time when the droplet hits and adheres to the substrate.
Figure 3B:
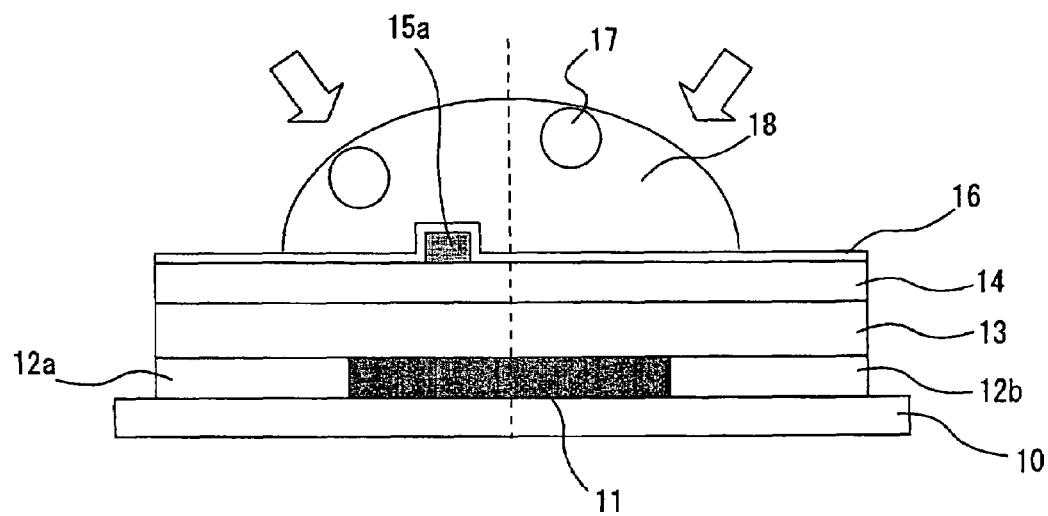
Figure 3C:
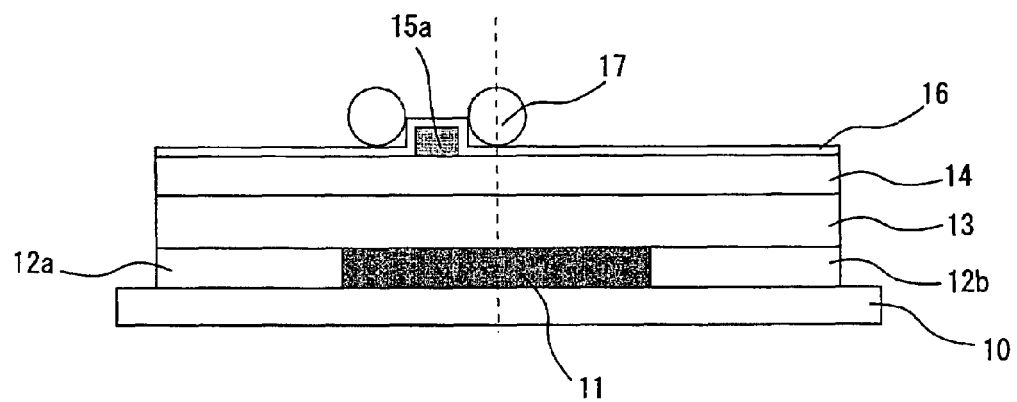
Figure 4A:
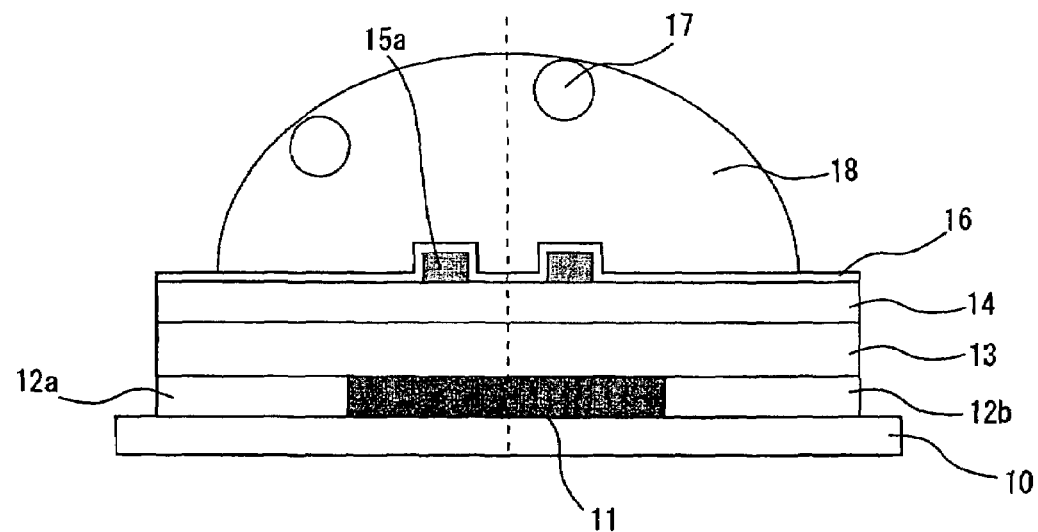
FIGS. 4A to 4C are schematic sectional views showing sequentially the situation of a dispersion droplet and a spacer varying until the spacer is located since the dispersion droplet hits and adheres to the substrate in the case where the spacer dispersion liquid is ejected on a CF substrate on which a projection structure exists only within a light-blocking area, wherein a dotted line in FIGS. 4A to 4C represents the center of the droplet at the time when the droplet hits and adheres to the substrate.
Figure 4B:
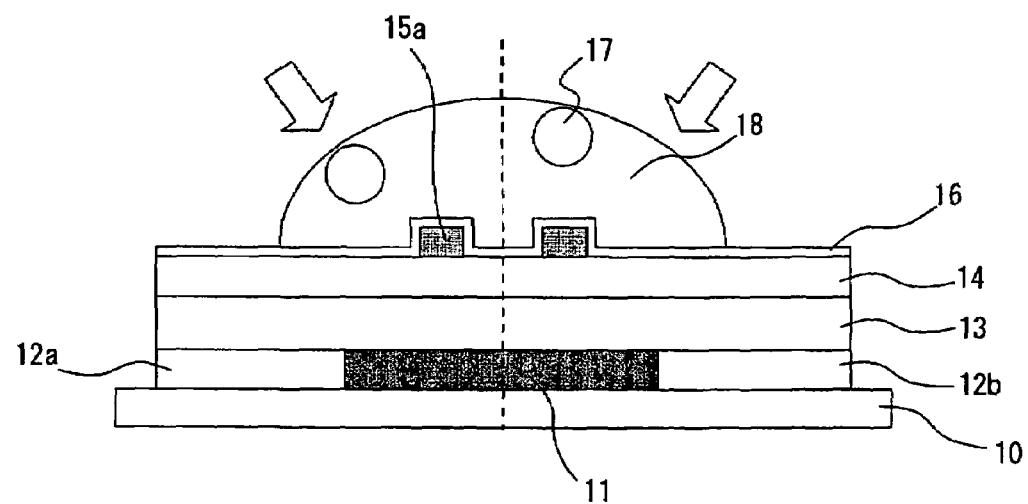
Figure 4C:
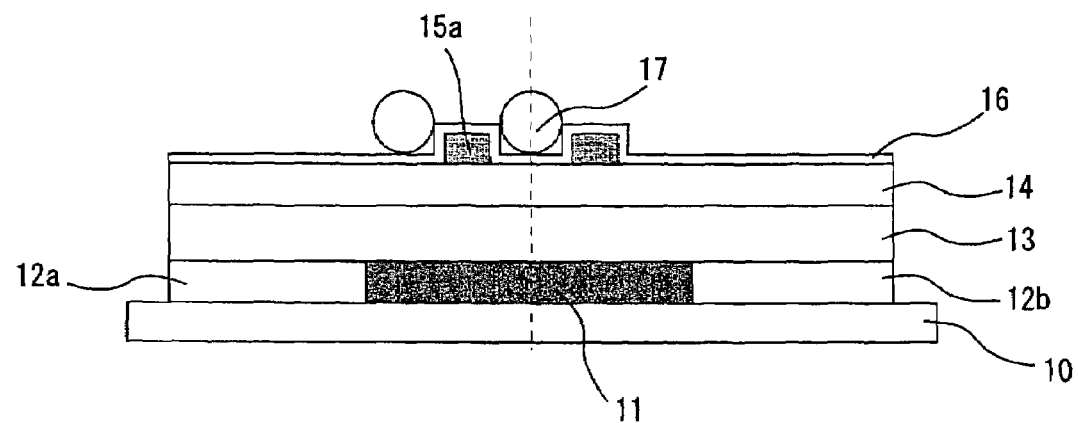
Figure 5A:
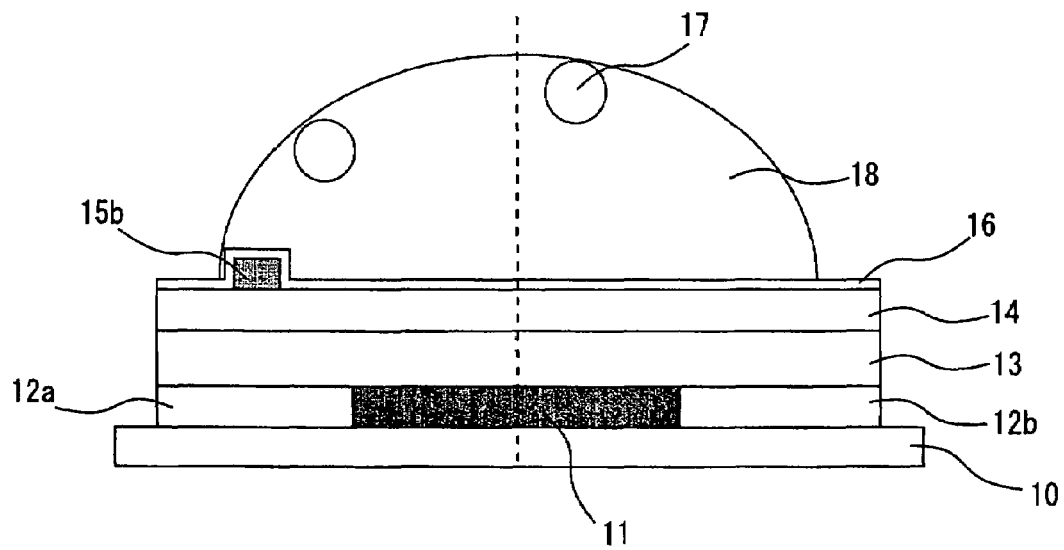
FIGS. 5A to 5C are schematic sectional views showing sequentially the situation of a dispersion droplet and a spacer varying until the spacer is located since the dispersion droplet hits and adheres to the substrate in the case where the spacer dispersion liquid is ejected on a CF substrate on which a projection structure exists only within a pixel area, wherein a dotted line in FIGS. 5A to 5C represents the center of the droplet at the time when the droplet hits and adheres to the substrate and a hollow arrow shows changes in a shape of the droplet.
Figure 5B:
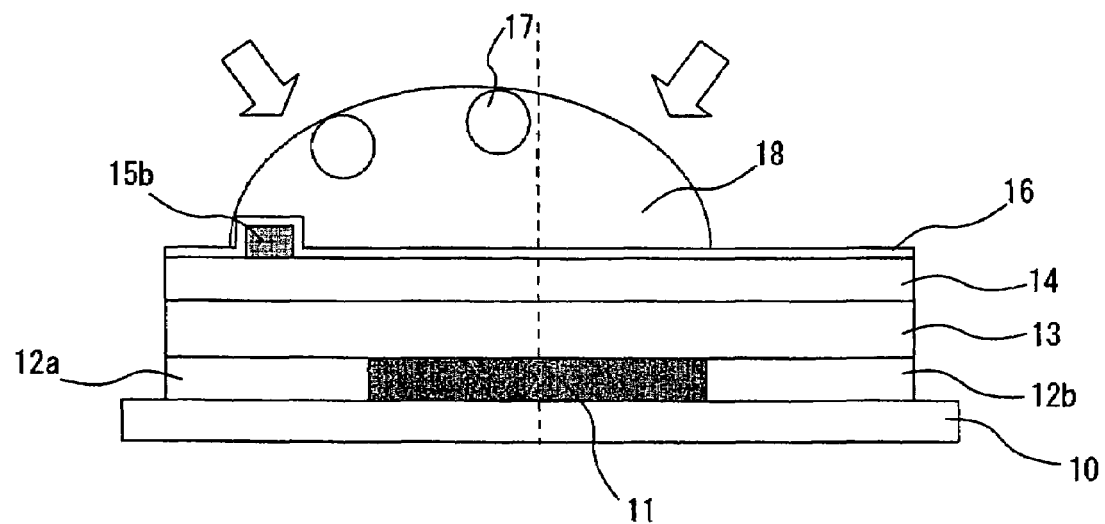
Figure 5C:
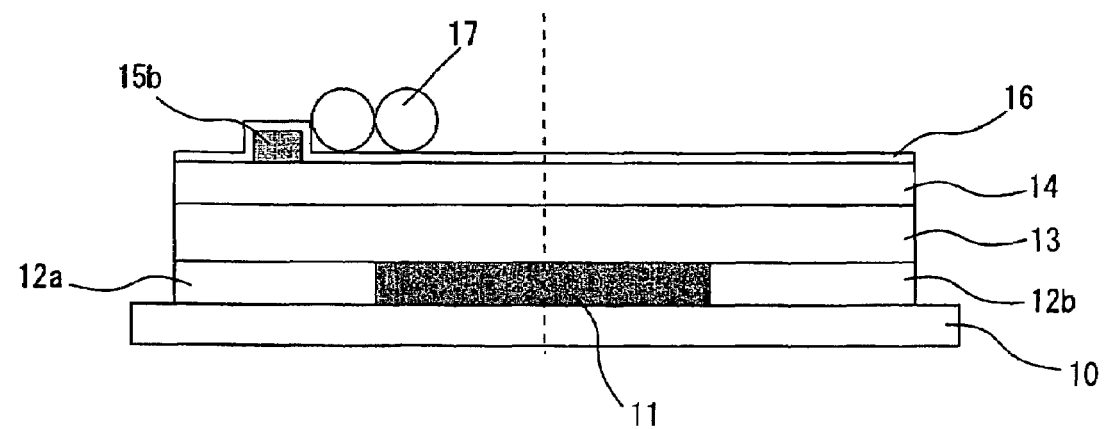
Figure 6A:
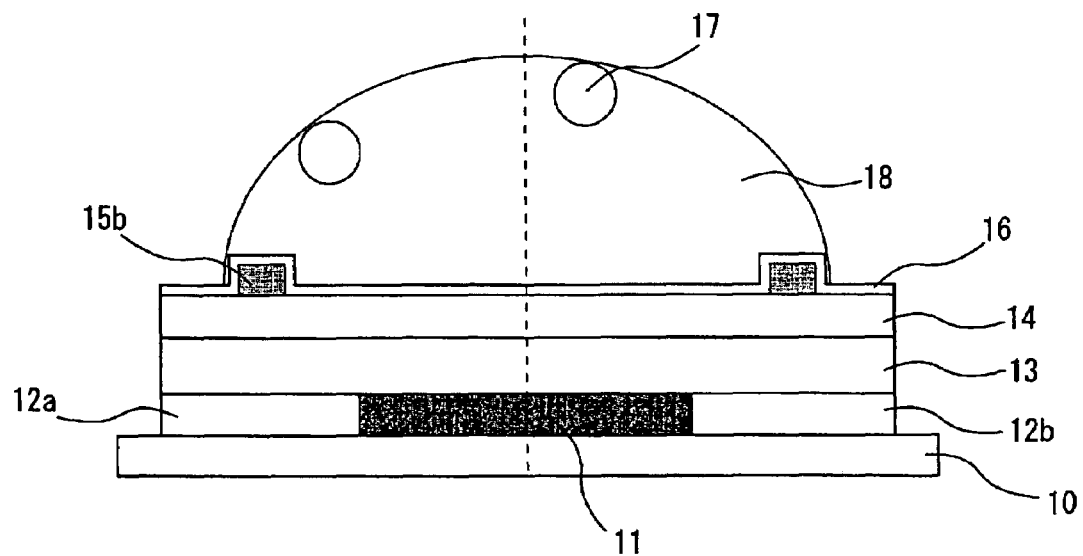
FIGS. 6A to 6C are schematic sectional views showing sequentially the situation of a dispersion droplet and a spacer varying until the spacer is located since the dispersion droplet hits and adheres to the substrate in the case where the spacer dispersion liquid is ejected on a CF substrate on which a projection structure exists only within a pixel area, wherein a dotted line in FIGS. 6A to 6C represents the center of the droplet at the time when the droplet hits and adheres to the substrate.
Figure 6B:
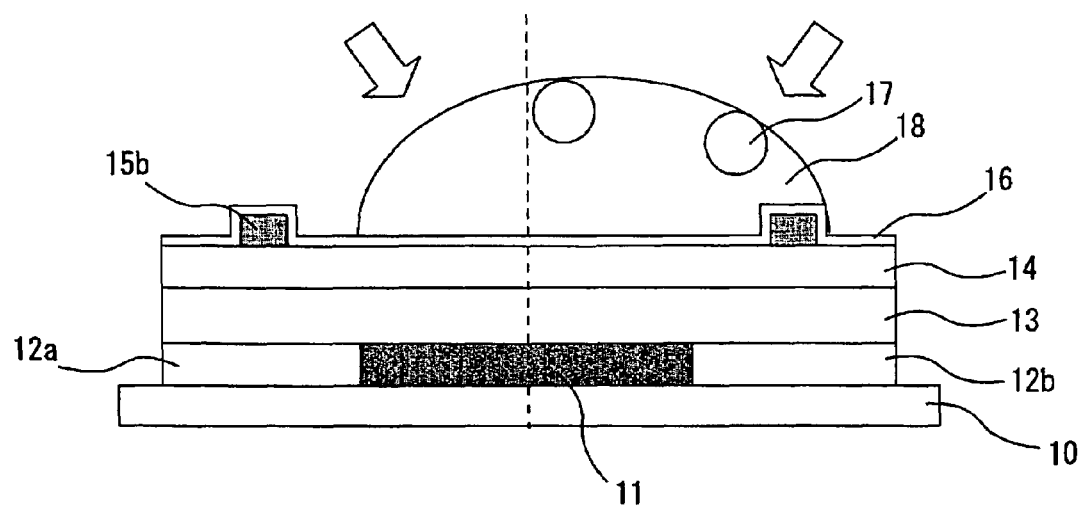
Figure 6C:
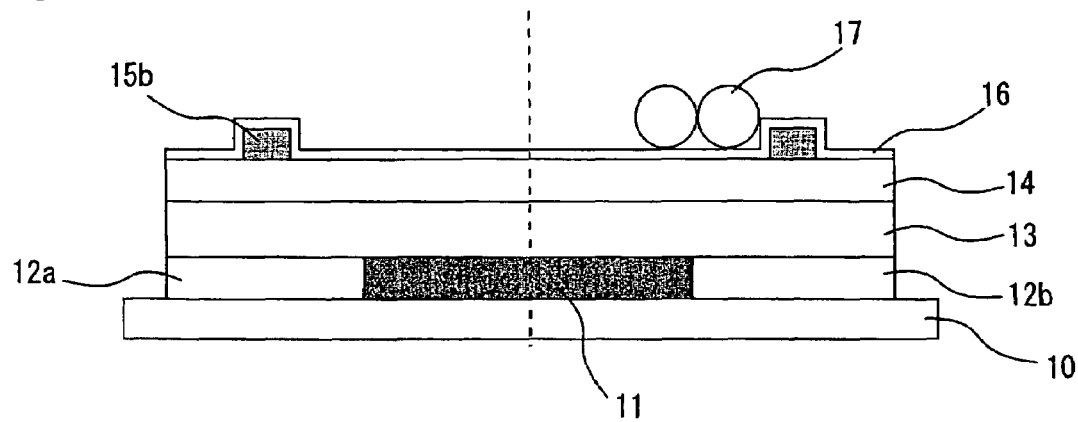
Figure 7A:
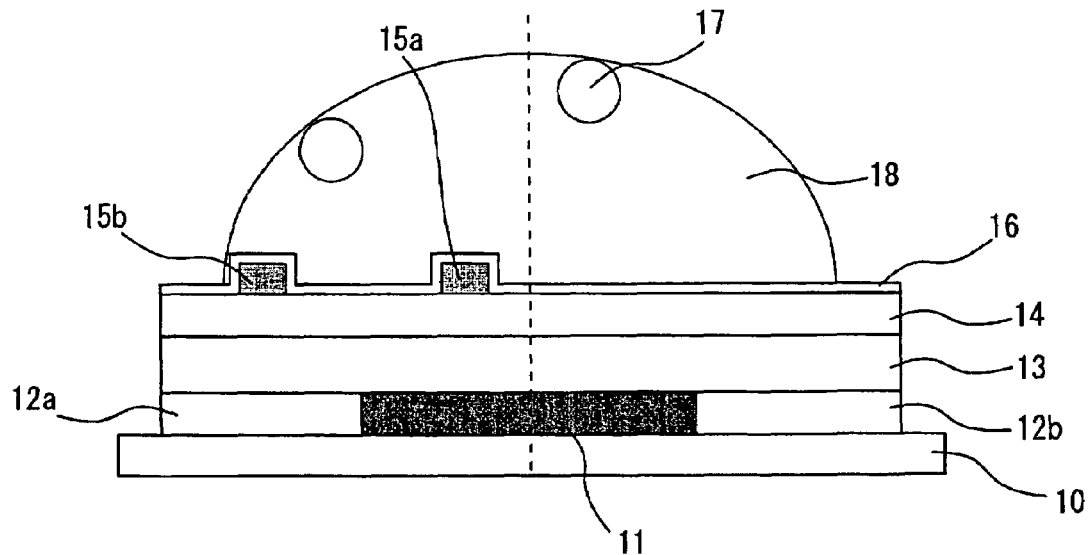
FIGS. 7A to 7C are schematic sectional views showing sequentially the situation of a dispersion droplet and a spacer varying until the spacer is located since the dispersion droplet hits and adheres to the substrate in the case where the spacer dispersion liquid is ejected on a CF substrate on which a projection structure exists within a light-blocking area and within a pixel area, respectively, wherein a dotted line in FIGS. 7A to 7C represents the center of the droplet at the time when the droplet hits and adheres onto the substrate and a hollow arrow shows changes in a shape of the droplet.
Figure 7B:
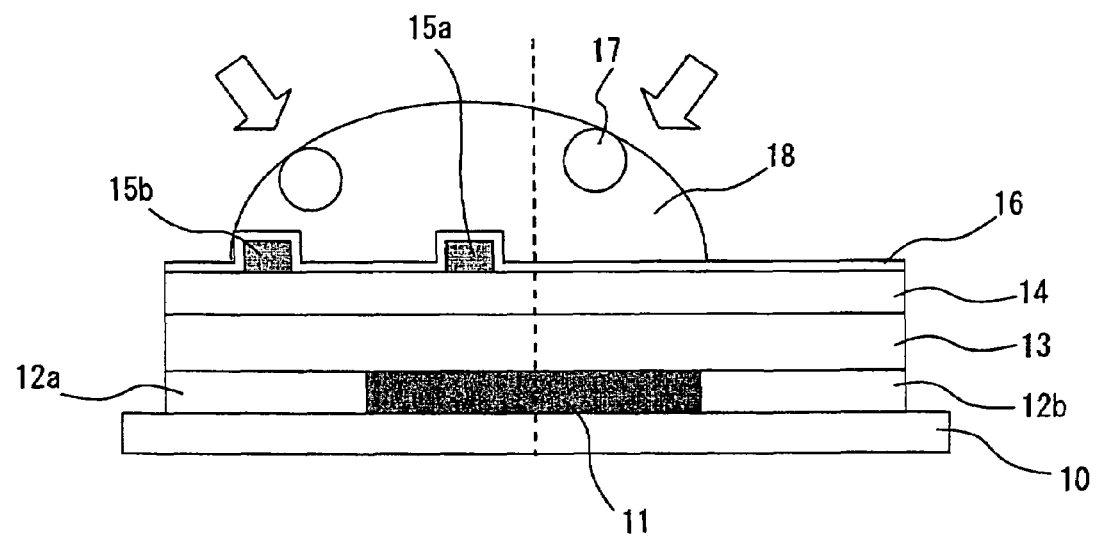
Figure 7C:
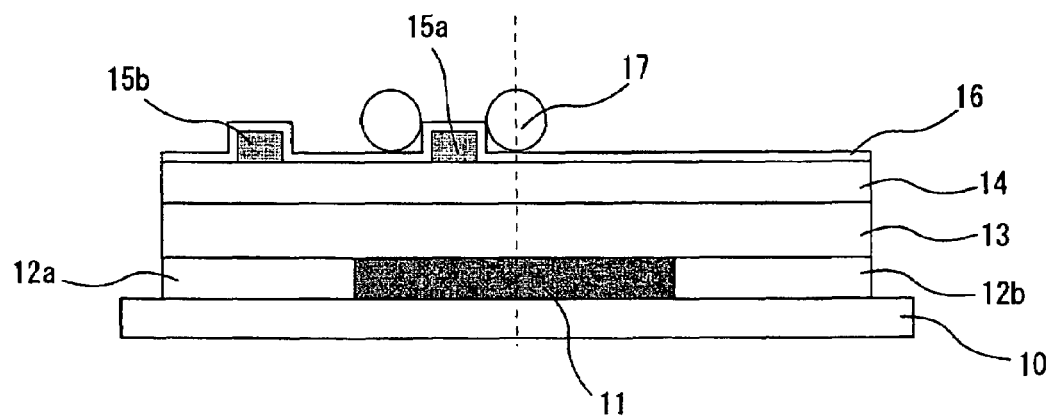
Figure 8A:
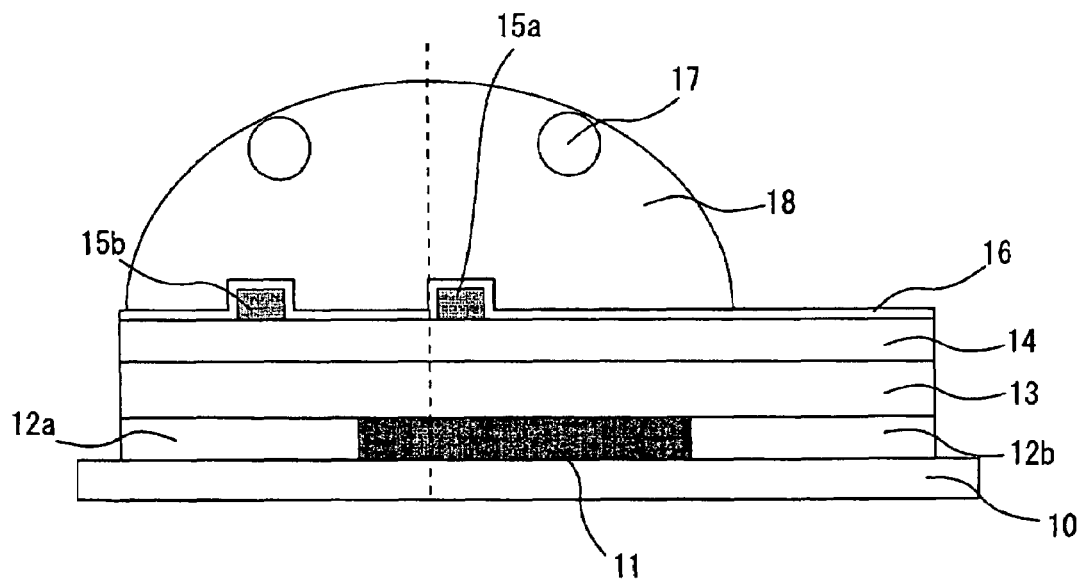
FIGS. 8A to 8C are schematic sectional views showing sequentially the situation of a dispersion droplet and a spacer varying until the spacer is located since the dispersion droplet hits and adheres to the substrate in the case where the spacer dispersion liquid is ejected on a CF substrate on which a projection structure exists within a light-blocking area and within a pixel area, respectively, wherein a dotted line in FIGS. 8A to 8C represents the center of the droplet at the time when the droplet hits and adheres onto the substrate and a hollow arrow shows changes in a shape of the droplet.
Figure 8B:
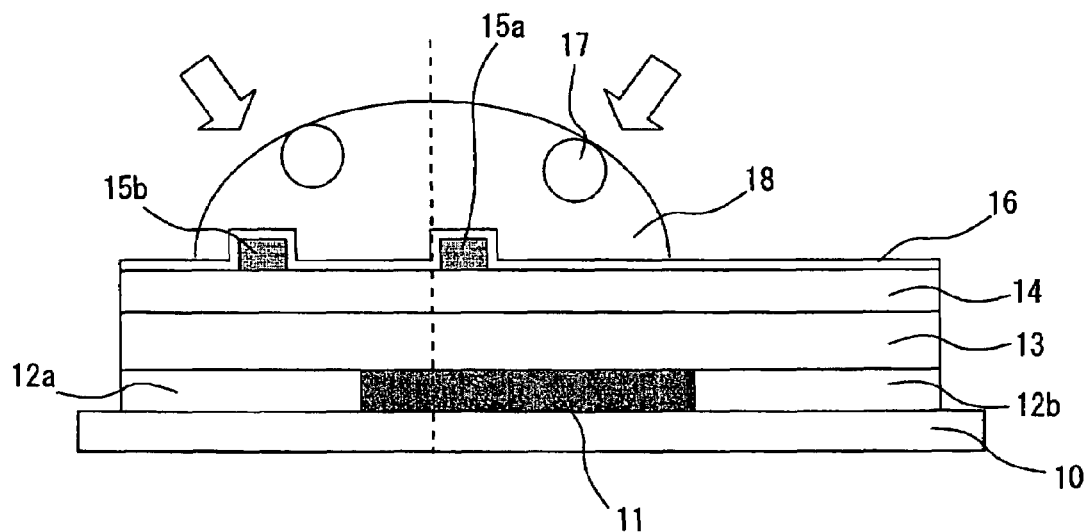
Figure 8C:
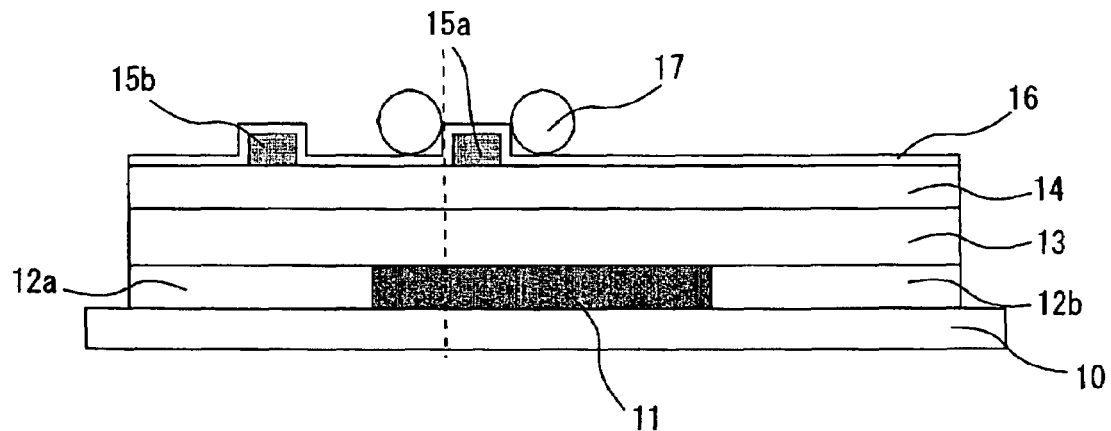
Figure 9:
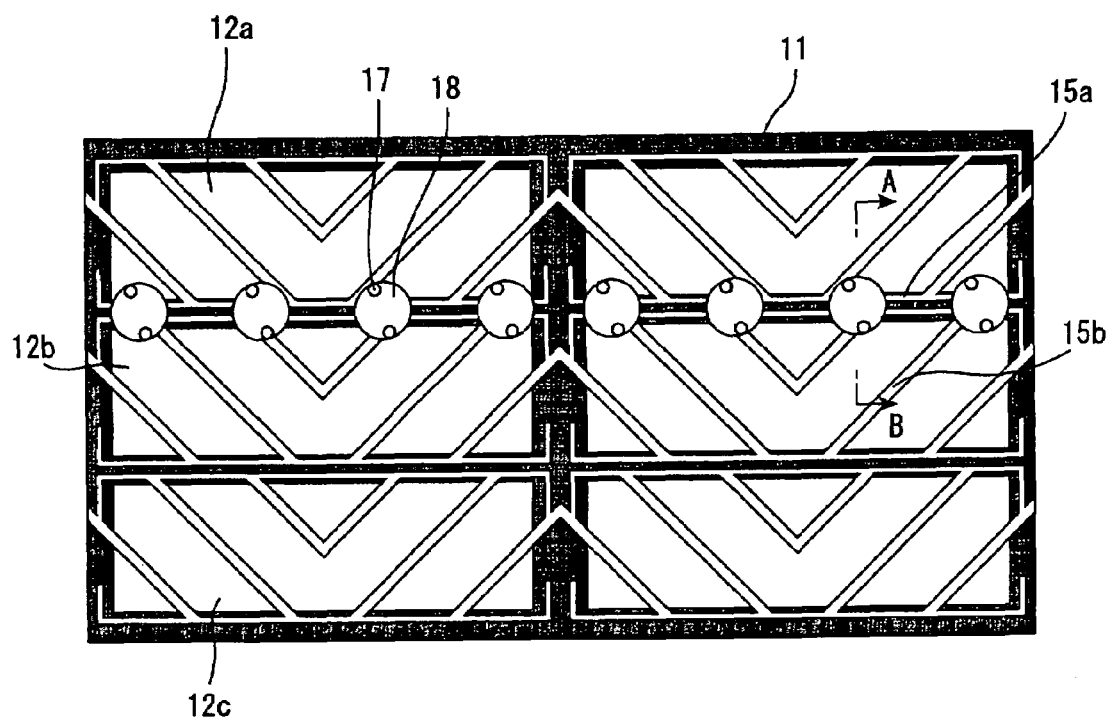
FIG. 9 is a schematic plan view showing a constitution of a CF substrate used in Embodiment 1.
Figure 10A:
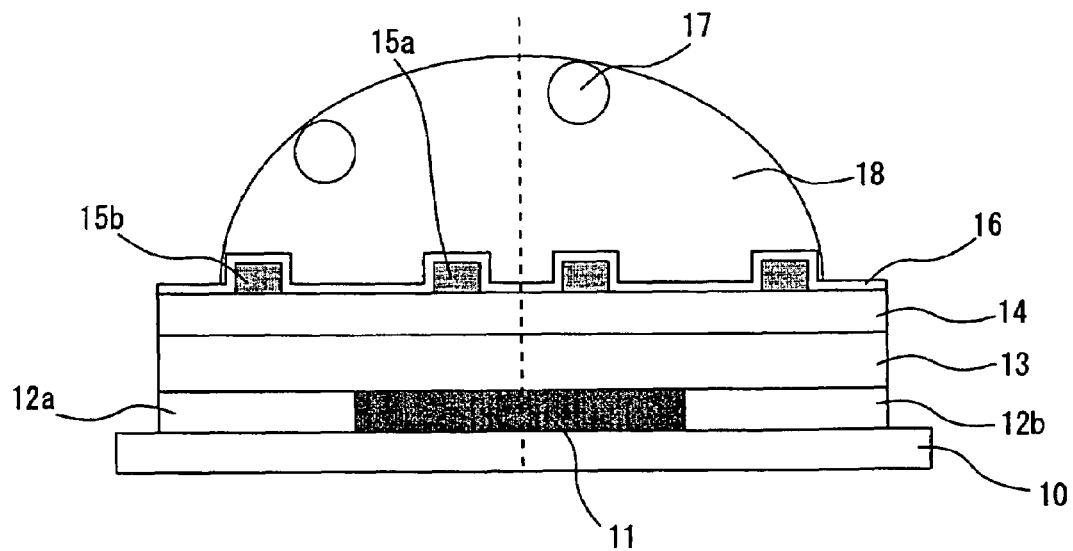
FIGS. 10A to 10C are schematic sectional views showing a section taken on line A-B of the CF substrate shown in FIG. 9 and showing sequentially the situation of a dispersion droplet and a spacer varying until the spacer is located since the dispersion droplet hits and adheres to the substrate, wherein a dotted line in FIG. 10 represents the center of the droplet at the time when the droplet hits and adheres to the substrate.
Figure 10B:
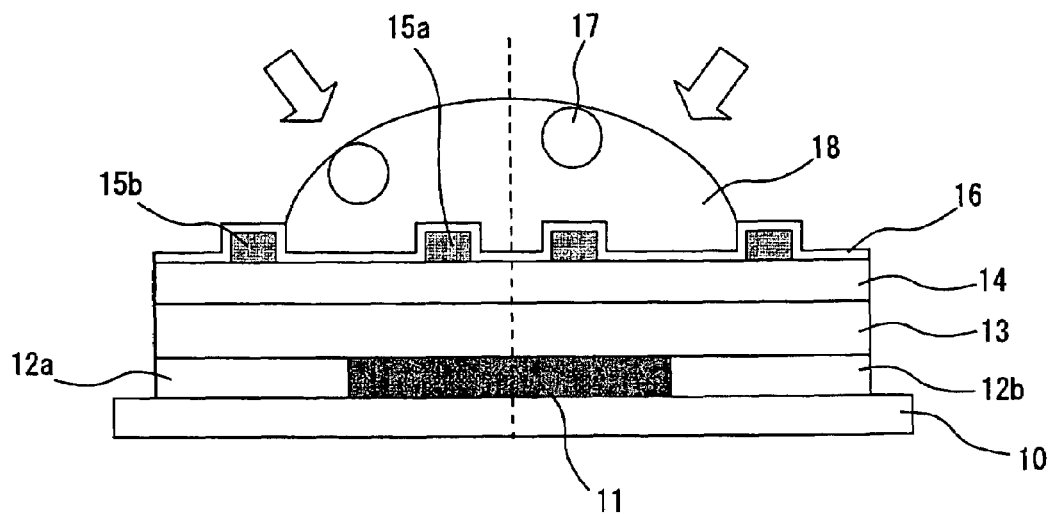
Figure 10C:
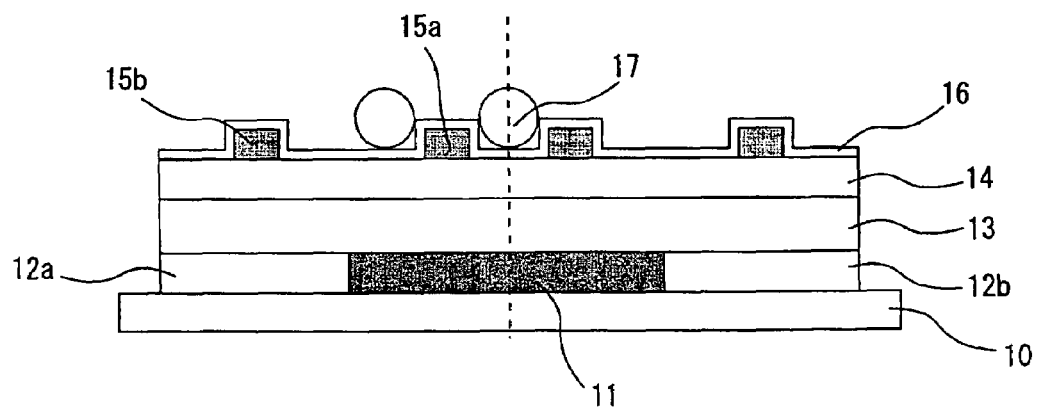
Figure 11:
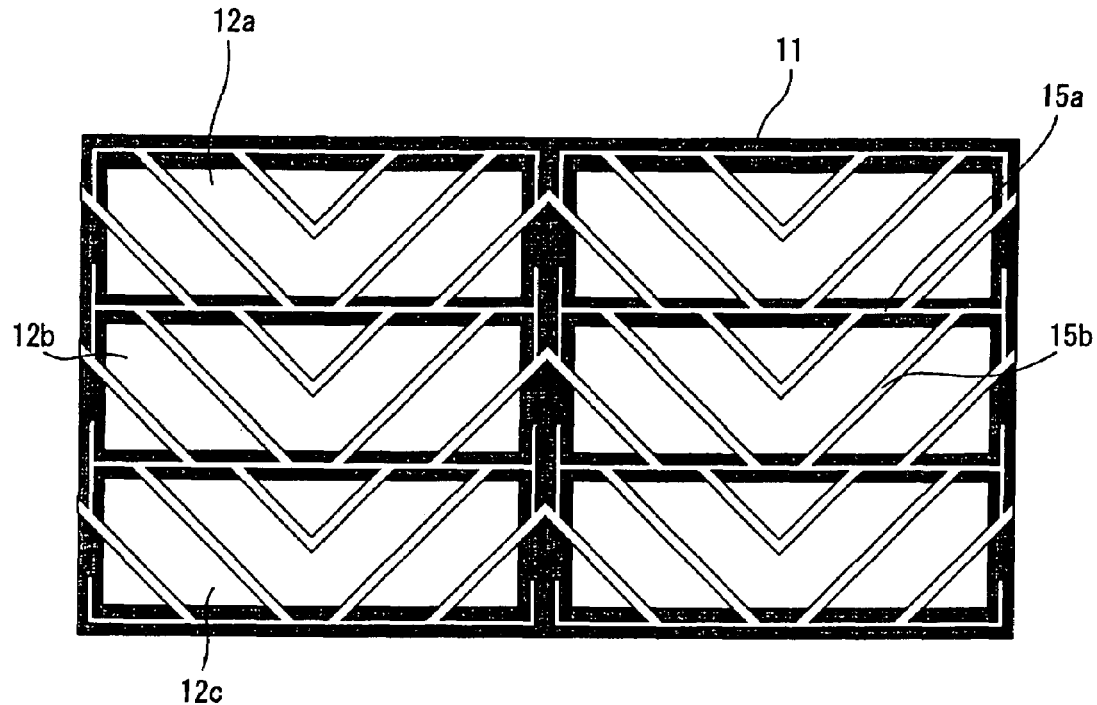
FIG. 11 is a schematic plan view showing a constitution of a CF substrate used in Embodiment 2.
Figure 12:
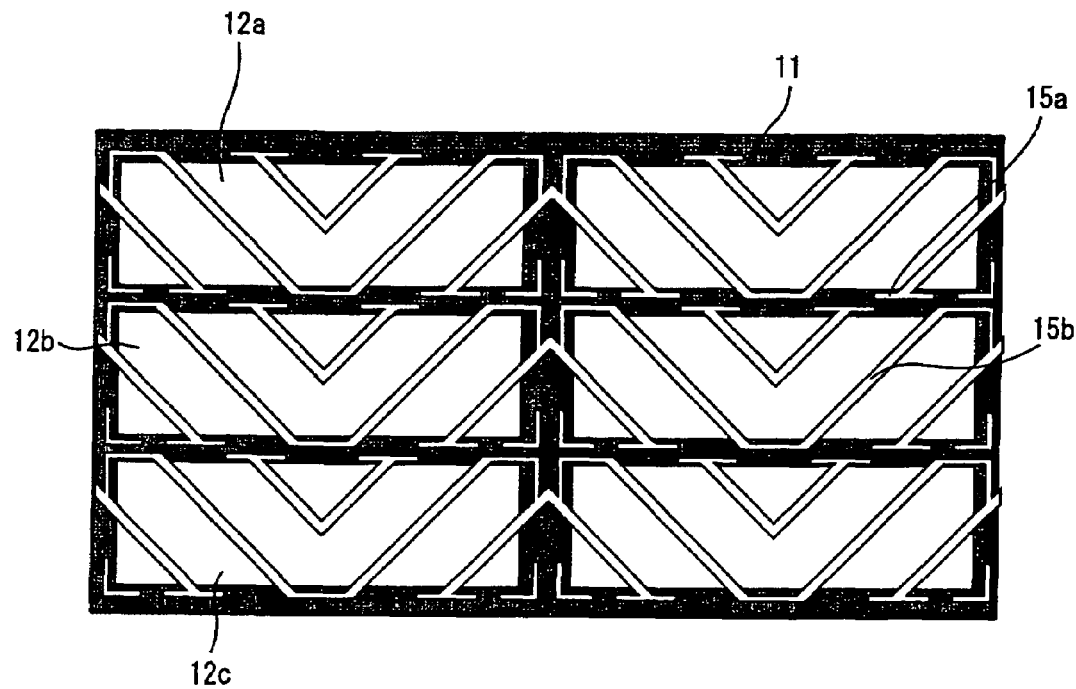
FIG. 12 is a schematic plan view showing a constitution of a CF substrate used in Embodiment 3.
Figure 13:
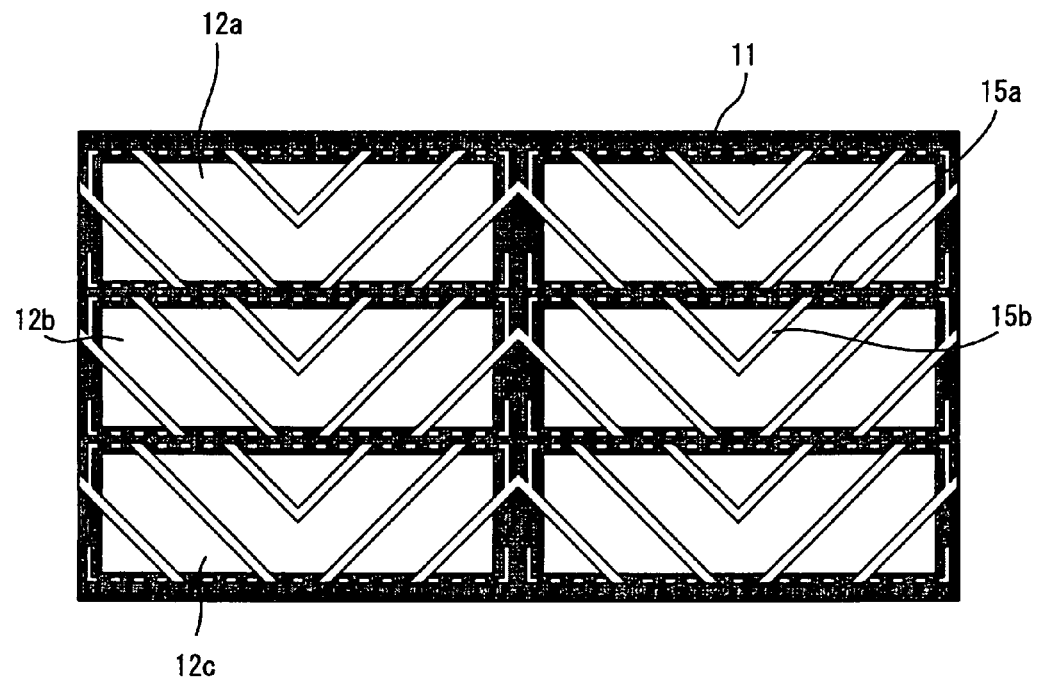
FIG. 13 is a schematic plan view showing a constitution of a CF substrate used in Embodiment 4.
Figure 14:
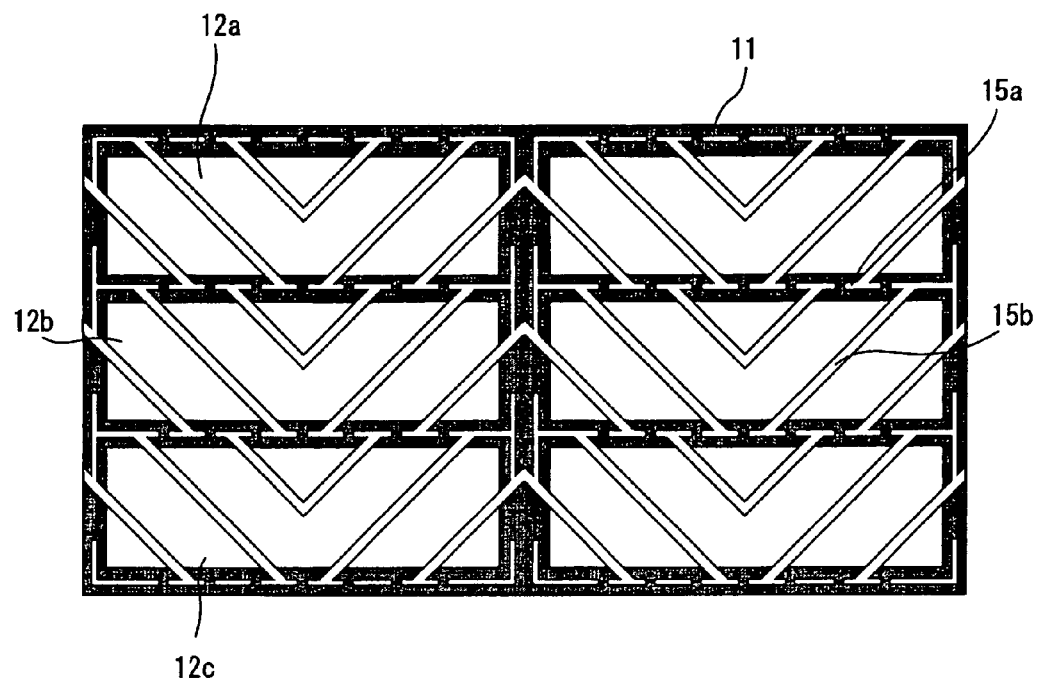
FIG. 14 is a schematic plan view showing a constitution of a CF substrate used in Embodiment 5.
Figure 15:
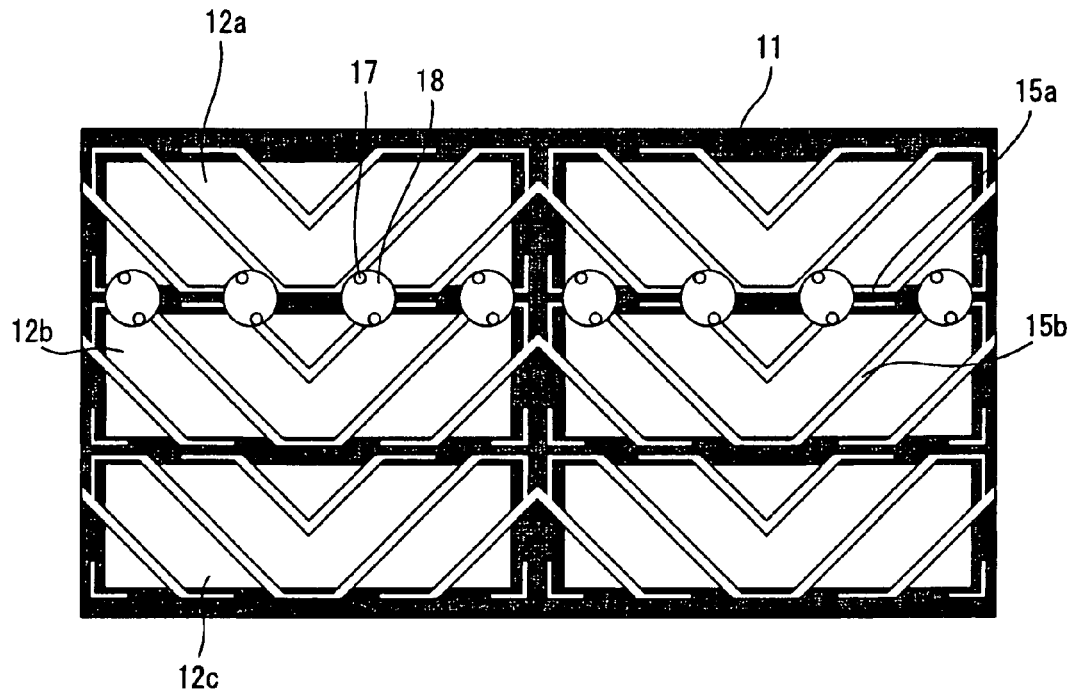
FIG. 15 is a schematic plan view showing a constitution of a CF substrate used in Embodiment 6.
Figure 16:
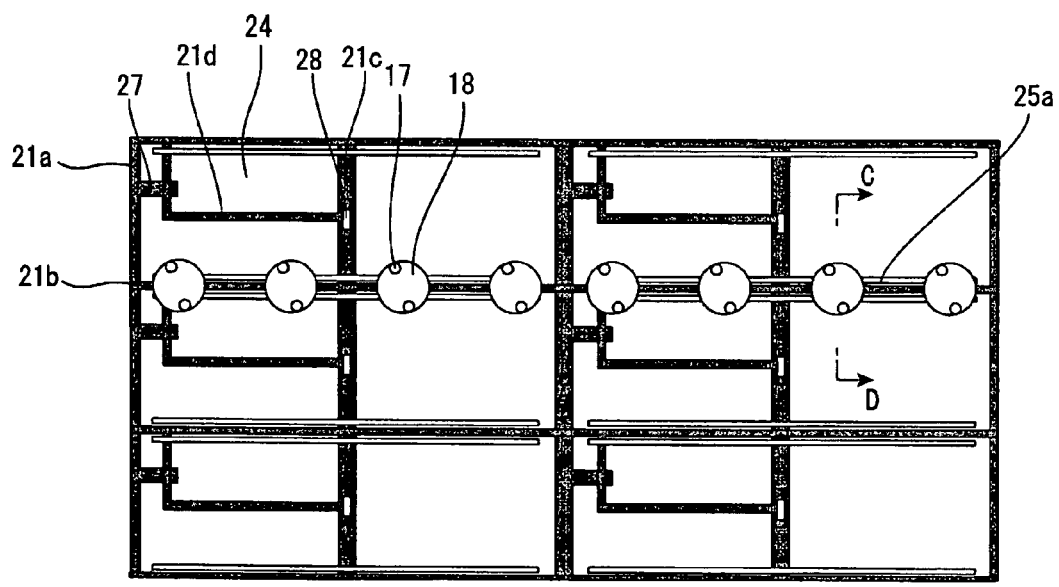
FIG. 16 is a schematic plan view showing a constitution of a thin film transistor (TFT) array substrate used in Embodiment 7.
Figure 17:
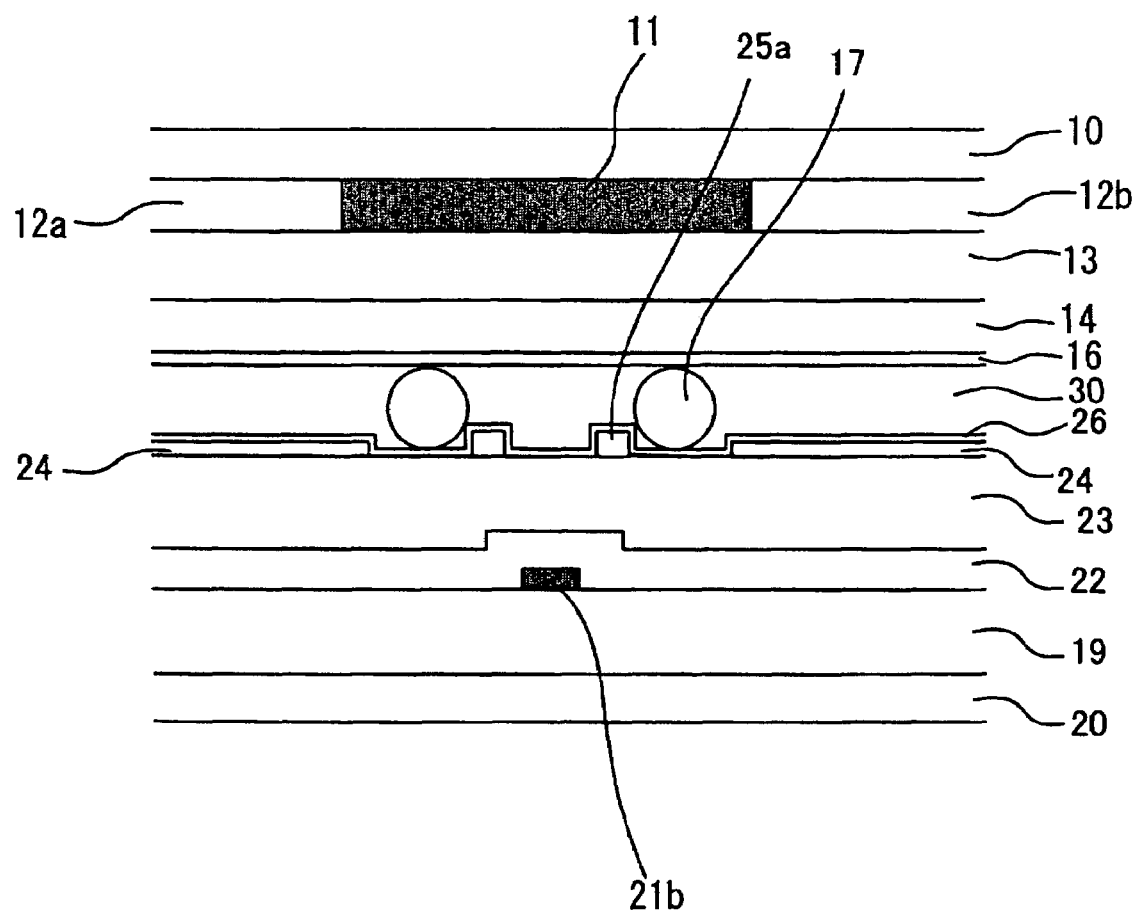
FIG. 17 is a schematic sectional view showing a constitution of a liquid crystal display panel fabricated using the TFT array substrate shown in FIG. 16, wherein the TFT array substrate 100 in FIG. 17 corresponds to a section taken on line C-D of the TFT array substrate shown in FIG. 16.

EXPLANATION OF LETTERS OR NUMERALS
DESCRIPTION OF SYMBOLS 10, 20: Glass substrate
11: black matrix (BM)
12a: First color layer
12b: Second color layer
12c: Third color layer
13: Over coat layer
14, 24: ITO electrode
15a, 25a: Projection for spacer location control
15b: Rib-shaped projection for alignment regulation
16, 26: Alignment layer
17: Spacer
18: Dispersion medium
19: Gate insulator
21a: Gate wiring
21b: Source wiring
21c: Storage capacitor wiring
21d: Drain wiring
22o: overcoating film
23: Interlayer insulation film
27: Thin film transistor
28: Contact hole
30: Liquid crystal layer
100: Thin film transistor array substrate
200: Color filter substrate

The invention claimed is:

1. A substrate for liquid crystal display devices having a light-blocking area and a pixel area, comprising:
   a spacer projection structure provided within a light-blocking area in a liquid crystal display device along a part of or all of patterns of the light-blocking area in the liquid crystal display device
   a spacer having a size and shape that maintains a distance between the substrate and another opposite substrate;
   said spacer projection structure attracting the spacer while the spacer is in a spacer-dispersion liquid in order to locate the spacer within the light-blocking area in the liquid crystal display device.

2. The substrate according to claim 1, the substrate constituting the liquid crystal display device together with the opposite substrate; and
   the spacer projection structure provided at a position within a light-blocking area in a projection structure-formed substrate or at a position corresponding to an area within a light-blocking area in the opposite substrate.

3. The substrate according to claim 1,
   the spacer projection structure provided in two or more rows per pattern of the light-blocking area in the liquid crystal display device.

4. The substrate according to claim 1, wherein the spacer projection structure includes a lyophilic material.

5. The substrate according to claim 1, wherein the spacer projection structure is a continuous body.

6. The substrate according to claim 1, wherein the spacer projection structure is a discontinuous body having a slit along a part of or all of patterns of the light-blocking area.

7. The substrate according to claim 1 being a color filter substrate.

8. The substrate according to claim 1 being a thin film transistor array substrate.

9. A liquid crystal display panel comprising:
   the substrate of claim 1.

10. A liquid crystal display device comprising the liquid crystal display panel of claim 9.

11. A method of producing the liquid crystal display panel of claim 9, comprising:
    a step of ejecting the spacer dispersion liquid in a vicinity of the spacer projection structure with an ejecting system.

12. A substrate for liquid crystal display devices having a light-blocking area and a pixel area, comprising:
    a spacer projection structure provided within a light-blocking area in a liquid crystal display device along a part of or all of patterns of the light-blocking area in the liquid crystal display device;
    an alignment regulation projection for alignment regulation provided in a pixel area in the liquid crystal display device; and
    the spacer projection structure provided in a vicinity of an intersection of an outer edge of the light-blocking area in the liquid crystal display device and the alignment regulation projection.

13. The substrate according to claim 12,
    the spacer projection structure composed of substantially the same material as the alignment regulation projection.

* * * * *